United States Patent [19]

Berg

[11] Patent Number: 5,345,473
[45] Date of Patent: Sep. 6, 1994

[54] APPARATUS FOR PROVIDING TWO-WAY COMMUNICATION IN UNDERGROUND FACILITIES

[75] Inventor: Antti Berg, Kiiminki, Finland
[73] Assignee: Outokumpu Oy, Helsinki, Finland
[21] Appl. No.: 123,691
[22] Filed: Sep. 17, 1993

Related U.S. Application Data

[63] Continuation of Ser. No. 879,062, Apr. 30, 1992, abandoned, which is a continuation of Ser. No. 126,592, Nov. 30, 1987, abandoned.

[30] Foreign Application Priority Data

Jan. 22, 1987 [FI] Finland .................................. 870286

[51] Int. Cl.⁵ .......................... H04B 13/02; H04B 1/44
[52] U.S. Cl. ............................................ 375/6; 375/7; 375/88; 455/19; 455/40; 455/82; 455/83; 343/741
[58] Field of Search ........................................ 375/5–7, 375/28, 45, 75, 88, 104; 379/58, 61; 455/19, 21, 24, 40–41, 55.1, 78, 82–83; 343/741

[56] References Cited

U.S. PATENT DOCUMENTS

| | | | |
|---|---|---|---|
| 2,998,516 | 8/1961 | Lehan et al. | 375/6 |
| 3,967,201 | 6/1976 | Rorden | 455/28 |
| 4,310,721 | 1/1982 | Manley et al. | 375/8 |
| 4,355,401 | 10/1982 | Ikoma et al. | 455/78 |
| 4,507,647 | 3/1985 | Hamlin et al. | 455/41 |
| 4,525,835 | 6/1985 | Vance et al. | 455/86 |
| 4,652,857 | 3/1987 | Meiksin | 375/6 |
| 4,677,688 | 6/1987 | Yoshihara et al. | 455/82 |
| 4,706,274 | 11/1987 | Baker et al. | 379/61 |
| 4,747,158 | 5/1988 | Goldberg et al. | 455/41 |
| 4,777,652 | 10/1988 | Stolarczyk | 455/3 |

FOREIGN PATENT DOCUMENTS

0218053 12/1984 Japan .................................. 455/82

OTHER PUBLICATIONS

Killen; "Modern Electronic Communication Techniques"; 1985; pp. 516–521.
Albert D. Helfrick, *Amateur Radio Equipment Fundamentals* Jan. 18, 1982, Prentice-Hall, Inc., p. 80.
Martin S. Roden, *Analog and Digital Communication Systems* 1985, Prentice-Hall, Inc., p. 367.

*Primary Examiner*—Stephen Chin
*Assistant Examiner*—Young Tse
*Attorney, Agent, or Firm*—Smith-Hill and Bedell

[57] ABSTRACT

The invention relates to an apparatus which is desiged for underground use in order to facilitate a two-way communication. The apparatus is operated within the frequency band 0.1–2 MHz, in order to make the electromagnetic waves propagate advantageously by utilizing the metal structures installed in the underground facilities and the bedrock itself. According to the invention, the transmitter/receiver unit is provided with an analog to digital converter (5) and respectively a digital to analog converter (20) in order to transmit the intermediate signal coded in digital form in between the two units of the apparatus.

12 Claims, 3 Drawing Sheets

APPARATUS FOR PROVIDING TWO-WAY COMMUNICATION IN UNDERGROUND FACILITIES

This application is filed as a continuation of application Ser. No. 07/879,062 filed Apr. 30, 1992, and now abandoned, which was filed as a continuation of application Ser. No. 07/126,592 filed Nov. 30, 1987, and is now abandoned.

BACKGROUND OF THE INVENTION

The present invention relates to an apparatus, e.g. a radiophone, to be employed in underground facilities such as mines, for providing two-way communication wherein the utilized mode of propagation of the radio waves is based, particularly with long communication distances, on the connecting of the electromagnetic waves to the metal structures, pipeworks and other conducting bodies installed in the mine galleries and shafts.

The basic problem in the underground employment of radiophones is the strong attenuation of electromagnetic waves under these conditions. This means that such radiophones that function perfectly well above ground do not function in a satisfactory way or in any way without special measures when they are used underground. Other environmental circumstances may also set additional requirements to the equipment employed.

A radiophone connection to a mine can be established in three different ways:
1. By employing the waveguide mode of propagation with frequencies of over 200 MHz;
2. By employing leaky feeders with frequencies 2–200 MHz; and
3. By employing propagation directly through the bedrock and based on the conducting bodies installed in the mines, in which case the frequency band 0.1–2 MHz may be possible.

The waveguide mode is a mode of propagation for electromagnetic waves, wherein the wave motion proceeds as if within a guide. The mine gallery can be considered as a kind of a waveguide. However, the attenuation of the signal is remarkable, and the obstacles—such as vehicles—located in the gallery cause additional attenuation. The method is not suited for the complex network of galleries in existing mines where the communication distances are long.

In the leaky feeder method, a long pair of cables within the same shield, or a loosely braided coaxial transmission line, is coupled to the radio transmitter. The field emitted by the transmission line can be captured by a portable receiver from a distance of a few tens of meters at the most with respect to the line. The antenna cable is installed in the mine galleries, and the use of portable equipment is possible in the vicinity of this antenna.

With a frequency below 2 MHz, such radiophone systems can be employed where the signal proceeds directly through the bedrock, or through existing conducting bodies such as power cables, pipework or hoist ropes. Direct propagation through the bedrock is dependent on the conductivity of the rock and on the employed frequency. If existing conducting bodies are utilized, the communication distances are rendered remarkably longer. The same is achieved if the base station is directly coupled to the cable which serves as the antenna.

SUMMARY OF THE INVENTION

The purpose of the present invention is to realize an apparatus, such as a radiophone, for providing two-way communication in underground facilities, which apparatus functions within the frequency band 0.1–2 MHz and utilizes the conducting bodies already existing in the mines for the propagation of the signal, the same signal being partly propagated in the bedrock as well. The essential novel features of the invention are apparent from the appended patent claims.

In accordance with the invention, advantageously a loop antenna is coupled to a transmitting and receiving apparatus providing a two-way communication connection, for instance speech connection, which apparatus utilizes digital transmission technique so that the coding of the speech into digital form is carried out by means of delta modulation. When a signal is modulated into radio frequency, frequency shift keying (FSK) is employed.

By means of the digital modulation technique, the sensitivity of the apparatus to interference and noise existing in the mines, owing for instance to the electric machinery employed, can be essentially reduced, because in digital transmission it is possible to transmit samples—of for example an analog signal—picked at sufficiently short intervals, and the original signal can be reconstructed on the basis of these samples. The said samples are advantageously coded so that at each particular moment of time there are only two alternative signals to be transmitted. Such signals that are distorted during the transmission and contain noise can in the reception be interpreted as one of the two alternatives, in which case the distorted signals can be regenerated in the intermediate amplifiers or in the repeaters included in the apparatus.

In digital transmission, the standard of the voice quality can also be maintained as long as the received bits are correctly interpreted, even if the signal to noise ratio would vary in the transmission. When the signal to noise ratio in digital modulation is deteriorated to a certain point, the fault probability of the received bits increases rapidly, and the original speech signal cannot be correctly decoded anymore. Therefore, in the method of the present invention, the coding of the speech into digital form is carried out by means of delta modulation, in which case the transmitted samples are coded by one bit. This differential coding is based on the fact that the successive samples picked of the signal correlate with each other, and on the base of the earlier samples picked of the same signal it is thus possible to try and predict the next sample. Consequently, the difference between the real sample and the predicted sample is the sample to be transmitted. Thus the decoding of the speech can be realized with a relatively small number of bits.

Owing to the good interference and noise tolerance of the digital modulation techniques applied in accordance with the present invention, the achieved communication distance is also extended. In case the modulation method is not interference and noise tolerant, the interference may cause much more limitations in the connection than the attenuation of the signal on the propagation path does. Therefore the method of the present invention uses, even when a signal is being modulated into radio frequency, an angle modulation method wherein the signal to noise ratio can be adjusted with respect to the bandwidth, and better results achieved thereby.

Furthermore, the digital transmission enables a complex processing of the signal, whereby propagation attenuation and interference can be compensated. In that case, in order to improve the mutual correlation of the successive samples picked of the signal, the number of transmitted bits is larger than should be necessary for the information in question at the transmission end. In reception, part of these redundant bits may be incorrectly interpreted without any resulting errors in the decoding of the useful signal. Moreover, owing to the digital transmission, the apparatus of the invention may employ highly integrated circuits, such as delta modulation circuits and phase-lock circuits in radio frequency modulation.

The method of communication used in the apparatus of the present invention may advantageously be for instance the so-called semiduplex. In that case a two-way speech connection works so that it is not possible to listen simultaneously when transmitting. Such methods of communication may also be utilized wherein for instance all receivers can hear the transmission from the base station or from a single radiophone. Moreover, the apparatus of the invention can be applied to the transmission of information other than speech. By taking the bandwidth limitations into account, the bandwidth required by a speech channel allows, when desired, the transmission of for instance measuring, control and production information, as well as a stationary monitoring image.

BRIEF DESCRIPTION OF THE DRAWINGS

In the following the invention is explained in more detail with reference to the appended drawings, wherein.

DETAILED DESCRIPTION

Figure 1:
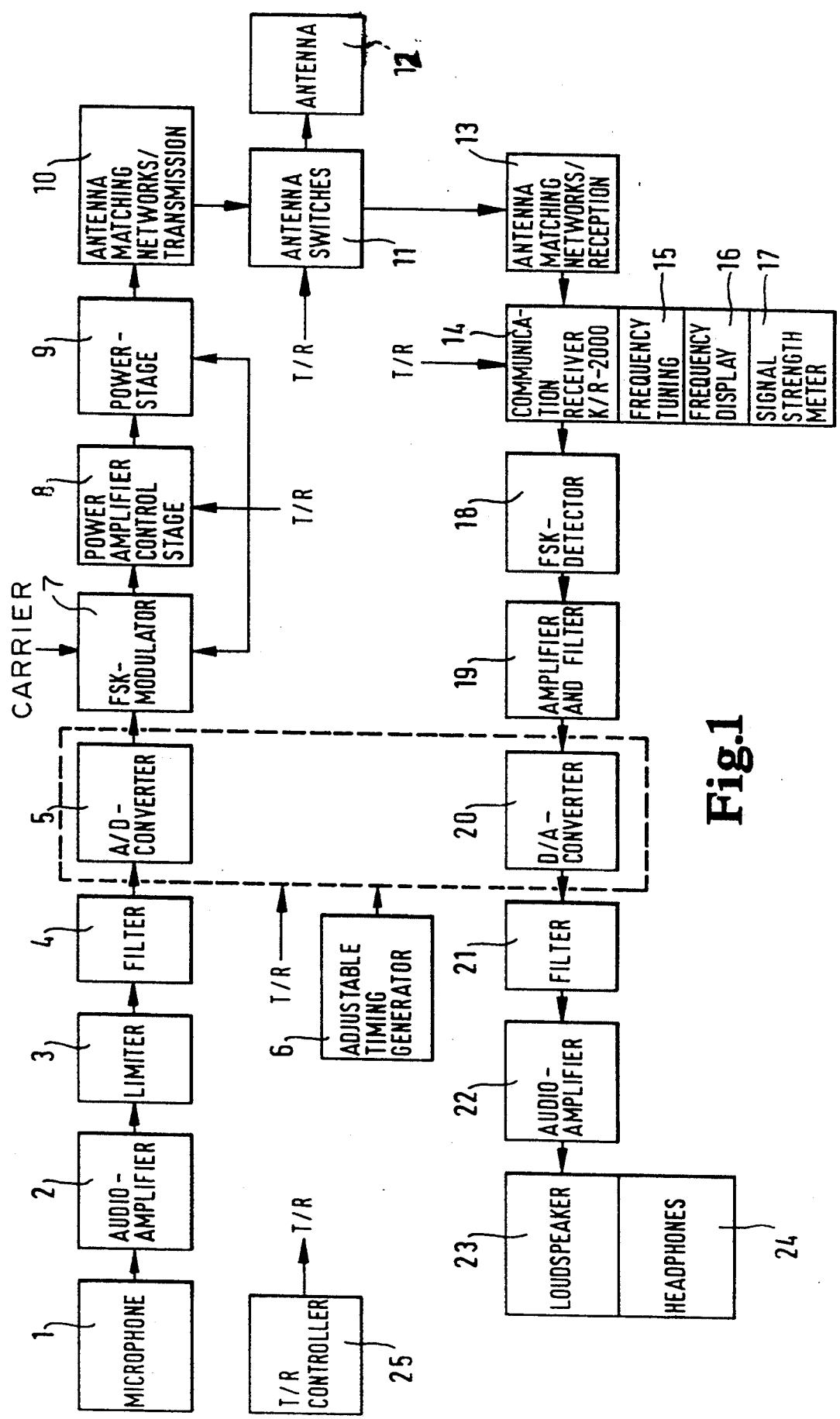
FIG. 1 is a schematical illustration of the devices in a preferred embodiment of the apparatus of the present invention.

According to FIG. 1, while using the apparatus of the invention in transmission, the audio signal received from the microphone 1 is amplified by the amplifier 2 and conducted through the limiter 3 and the filter 4 in order to make the signal suitable in amplitude for the analog to digital converter 5. The filter 4 removes from the speech signal such frequency components that are unnecessary for intelligibility. The analog to digital converter 5 converts the thus preprocessed signal into digital form, i.e. the signal is represented by means of the samples picked thereof. The length of the sample intervals can be varied by the aid of the timing generator 6.

The analog to digital converter 5 is operated according to the delta modulation principle so that while the value of a speech signal is increasing, the converter 5 gives a bit designating logic 1, and while the signal value is decreasing, the converter gives a bit designating logic zero. These speech-describing bits in turn control the FSK modulator 7 which modulates a carrier having a frequency in the range 0.1–2 MHz, by means of frequency shift keying. With the bit zero, the modulator 7 produces a given frequency, and with the bit 1 it produces another given frequency. The thus received radio-frequency signal is amplified by means of the control stage 8 and the power stage 9 of the power amplifier. The obtained power is transmitted, via the antenna matching network 10 and the antenna switches 11, to the antenna 12.

While employing the apparatus of the invention in the reception of a signal, the weak signal received by means of the antenna 12 is conducted, via the antenna switches 11 and the matching network 13 to the receiver unit 14. This receiver unit 14 also comprises the frequency tuning 15 and the display 16, as well as the signal strength meter 17. The intermediate frequency signal created in the receiver 14 is conducted into the FSK detector 18, which is advantageously operated according to the phase lock principle. The signal received from the detector 18 is further amplified and filtered in the separate amplifying and filtering stages 19, and thus a string of bits corresponding to the transmitted string of bits is reconstructed. On the basis of this obtained string of bits, the digital to analog converter 20 forms an analog signal, which is further filtered in the filter 21 in order to eliminate the effects of the sampling. Thereafter the signal amplified in the amplifier 22 can be heard in speech, corresponding to the transmitted speech, from the loudspeaker 23 or from the headphones 24.

In order to make the apparatus of the invention work both in the transmission and in the reception, in connection with the microphone 1 there is provided the control member 25—as is seen in FIG. 1—whereby a transmission/reception control is achieved. This control member 25 is needed because the apparatus of the invention includes components which are common both to the transmission and the reception, and which therefore need information as to which mode of operation is in question at each given time. Moreover, the receiver must be attenuated for the duration of the transmission, whereas the voltages of the transmission circuits must be switched off during reception.

Figure 2:
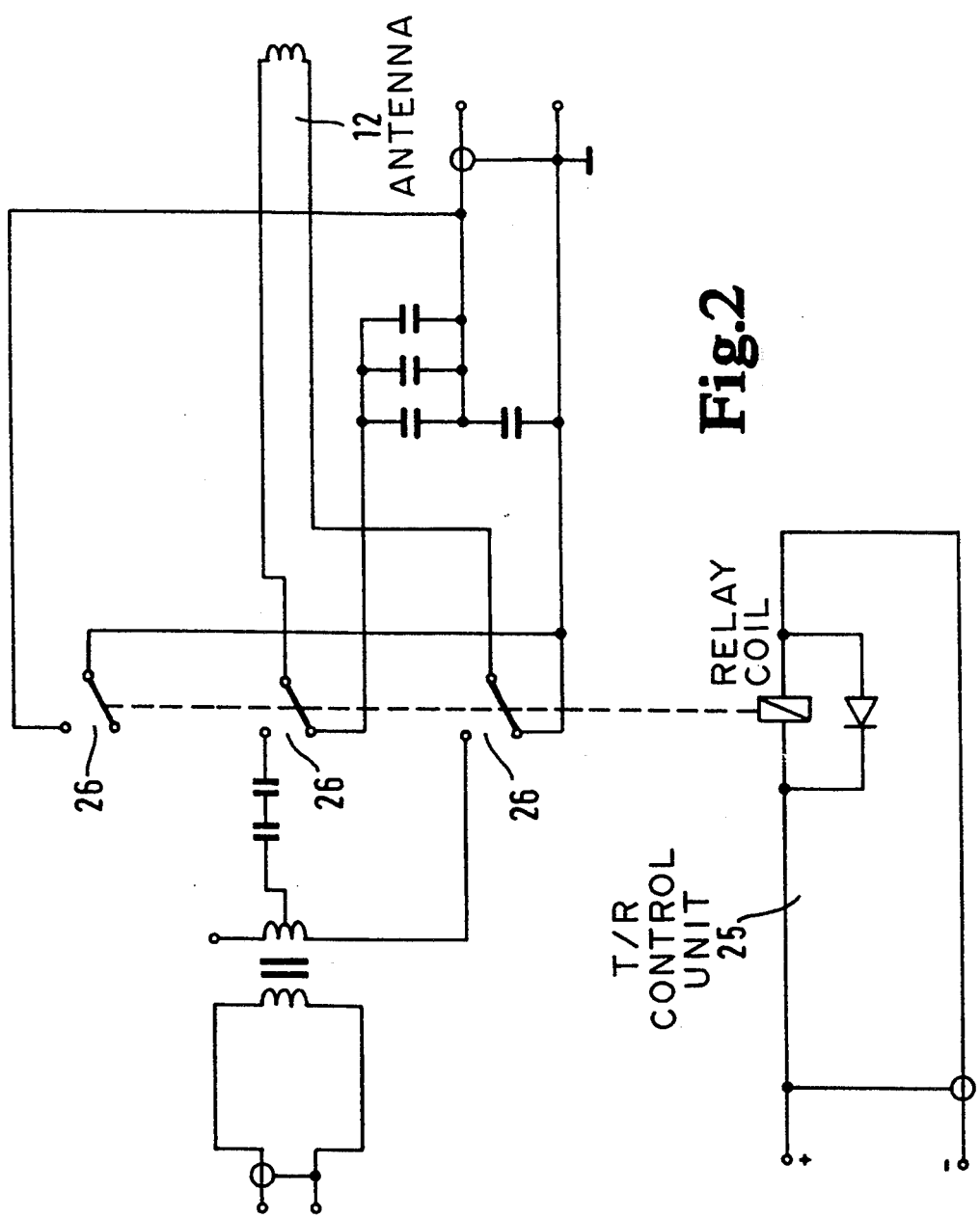
FIG. 2 illustrates the antenna circuit diagram advantageously suited for the embodiment of FIG. 1.

One of the components common for both the transmission and the reception in the apparatus of the invention is the antenna 12, the operation whereof is described in FIG. 2. During transmission, the antenna 12 is tuned to series resonance in order to obtain maximal power from the power stage 9 into the antenna 12. In the case of reception—in which position the switches 26 seen in FIG. 2 are set—there is employed parallel resonance in order to obtain maximal voltage from the antenna 12. The operation of the switches 26 is controlled by means of the control member 25. By employing the tuning of the antenna 12 illustrated in FIG. 2, there is achieved not only maximal power transmission but also band limiting of interference signals. The antenna 12 may be for example an essentially circular loop antenna, but the size of the said antenna 12 can be reduced for instance by advantageously employing a ferrite core in the loop antenna.

Figure 3:
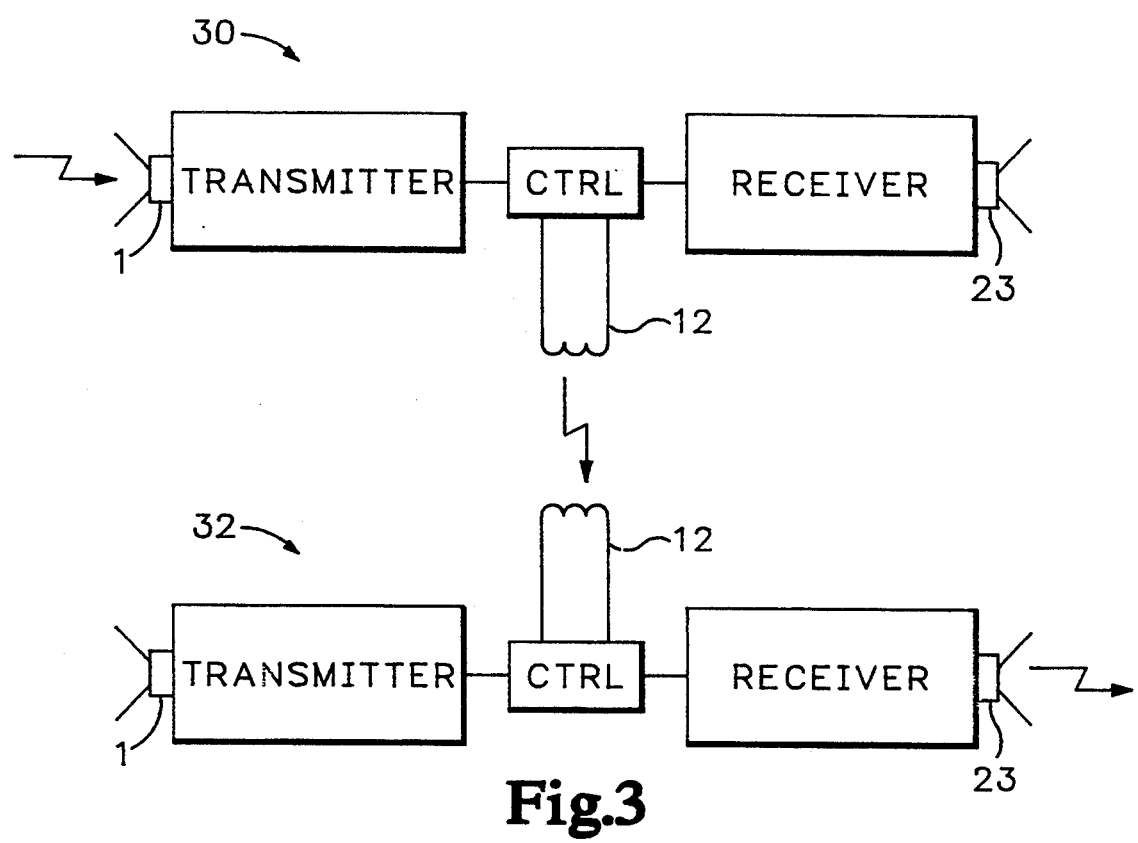
FIG. 3 illustrates in block form two transmitter/receivers of the kind shown in FIG. 1.

FIG. 3 shows two transmitter/receivers 30 and 32, each of which is of the form shown in FIG. 1. The two transmitter/receivers may be used to provide semi-duplex speech communication. When a transmitter/receiver 30 is operating in the transmit mode, the transmitter/receiver 32 operates in the receive mode, and vice versa.

I claim:

1. A receiver apparatus for receiving information in an underground facility comprising:

an antenna means for receiving a digitally frequency shift keyed modulated electromagnetic carrier signal at a frequency in the range 0.1-2 MHz and having a sequence of high modulation frequency time intervals and low modulation frequency time intervals and generating a received signal;

a selective receiver means for receiving the received signal from the antenna means and selecting predetermined frequency components of the received signal and rejecting other frequency components of the received signal so as to produce a first IF signal having the digitally modulation of the digitally electromagnetic carrier signal, said selective receiver means including a frequency tuning means for tuning the selective receiver means, a frequency display means for providing a display of frequency to which the selective receiver means is tuned, and a signal strength meter for providing a display of strength of the received signal;

a frequency shift keying detector for demodulating the first IF signal and producing a digital signal as a series of 1's and 0's according to the respective high modulation frequency time intervals and low modulation frequency time intervals of the first IF signal;

a digital-to-analog converter for converting the digital signal to analog form according to a predetermined decoding algorithm and producing an analog electrical signal; and an audio generator for receiving the analog electrical signal and producing an acoustic signal representative of the analog electrical signal.

2. A receiver apparatus according to claim 1, further comprising an amplifier and filter means between the frequency shift keying detector and the digital-to-analog converter for receiving said digital signal from the frequency shift keying detector and producing a conditioned digital signal by removing values of the digital signal which do not represent a valid value as determined according to a predetermined encoding sequence and outputting the conditioned digital signal as said digital signal to be received by the digital-to-analog converter.

3. A receiver apparatus according to claim 1, wherein the predetermined decoding algorithm of the digital-to-analog converter is a delta decoding algorithm.

4. A receiver apparatus according to claim 1, wherein the selective receiver means has an input port of a high input impedance for receiving said received signal, and the antenna means comprises an antenna having an output port of a given antenna impedance and a matching network between the antenna and the selective receiver means for matching the input impedance of the selective receiver means to the antenna impedance of the antenna so as to form a parallel resonant tank circuit having a parallel resonant frequency equal to said carrier frequency.

5. A receiver apparatus according to claim 1, wherein the digital modulation of the digitally frequency shift keyed modulated carrier signal is representative of digitized audio speech that has been sampled and digitally encoded only to the extent necessary to convey the information thereof, and wherein the audio generator functions to reproduce the information of said audio speech as said acoustic signal produced by the audio generator from said analog electrical signal.

6. A transceiver apparatus for providing two-way information communication in an underground facility, comprising:

a transmitter device having an audio input for receiving an input signal containing primary information, a filter means for filtering the input signal and producing a primary signal having only those frequency components necessary for communicating said primary information, an analog-to-digital converter for converting the primary signal into a digital signal according to a predetermined coding algorithm, and a modulator for producing a modulated carrier signal by using said digital signal and a predetermined modulation format to modulate a carrier signal having a frequency in the range from 0.1-2 MHz;

an antenna network having an antenna, said antenna network being operable selectively either for receiving the modulated carrier signal from the transmitter device and propagating the modulated carrier signal in electromagnetic form, or for receiving a modulated electromagnetic carrier signal having a frequency in the range from 0.1 to 2 MHz and generating a received signal; and a receiver device having a receiver input for receiving the received signal, a selective receiver means for removing frequency components outside a predetermined spectral range from the received signal for producing an IF signal having the modulation that was present on the modulated electromagnetic signal, a detector for demodulating the IF signal according to the inverse of said predetermined modulation format to produce a received digital signal, a digital-to-analog converter for producing a decoded digital signal by decoding the received digital signal according to the inverse of said predetermined coding algorithm, and an audio generator for producing an analog output signal representative of the decoded digital signal, said selective receiver means including a frequency tuning means for tuning the selective receiver means, a frequency display means for providing a display of frequency to which the selective receiver means is tuned, and a signal strength meter for providing a display of strength of the received signal.

7. A transceiver apparatus according to claim 6, wherein the received digital signal produced by the detector of the receiver device comprises a bit sequence of 1's and 0's and the receiver device further comprises a second filter means between the detector and the digital-to-analog converter for correcting erroneous bits of said received digital signal according to the sequence required according to said predetermined coding algorithm and said second filter means outputs the corrected digital signal as said received digital signal to the digital-to-analog converter.

8. A transceiver apparatus according to claim 6, wherein the predetermined coding algorithm is delta coding.

9. A transceiver apparatus according to claim 6, wherein the predetermined modulation format is frequency shift keying.

10. A transceiver apparatus according to claim 6, wherein the selective receiver means of the receiver device has a high input impedance, the modulator of the transmitter device further has a given transmitter output impedance, the antenna of the antenna network has a given antenna impedance, and the antenna network comprises a transmitter matching network for matching the transmitter output impedance of the modulator with the given antenna impedance when the antenna is operable to propagate said modulated carrier signal in electromagnetic form, wherein said transmitter matching network creates a series resonant circuit having a series resonant frequency equal to the frequency of said carrier signal, and a receiver matching network for matching the antenna impedance to the high input impedance of the selective receiver means when the antenna is operable to receive the modulated electromagnetic carrier, wherein said receiver matching network forms a parallel resonant tank circuit having a parallel resonant frequency equal to the frequency of said modulated electromagnetic carrier.

11. A transceiver apparatus according to claim 10 wherein the antenna is a loop antenna having two opposite ends, said ends being connected to said transmitter matching network when the antenna is operable to propagate said modulated carrier signal in electromagnetic form and connected to said receiver matching network when the antenna is operable to receive the modulated electromagnetic carrier.

12. A transceiver apparatus according to claim 6, further comprising control means for selectively connecting either the transmitter device or the receiver device to the antenna network so that when the transmitter device is connected to the antenna network and the antenna network receives the modulated carrier signal from the transmitter, the antenna propagates the modulated carrier signal in electromagnetic form, and when the receiver device is connected to the antenna network and the antenna receives a modulated electromagnetic carrier having a frequency in the range from 0.1 to 2 MHz, the antenna network generates the received signal which is applied to the receiver input of the receiver device.

* * * * *